United States Patent [19] [11] 4,368,294
Deubzer et al. [45] Jan. 11, 1983

[54] PROCESS FOR PREPARING ORGANOPOLYSILOXANE MODIFIED ORGANIC POLYMERS

[75] Inventors: Bernward Deubzer, Burghausen, Fed. Rep. of Germany; Josef Esterbauer, Unterweizberg, Austria; Christian Solbrig, Mehring-Od; Volker Frey, Burghuasen, both of Fed. Rep. of Germany

[73] Assignee: Wacker-Chemie GmbH, Munich, Fed. Rep. of Germany

[21] Appl. No.: 239,226

[22] Filed: Feb. 27, 1981

[30] Foreign Application Priority Data

Mar. 4, 1980 [DE] Fed. Rep. of Germany ....... 3008138

[51] Int. Cl.$^3$ ............................................. C08L 83/06
[52] U.S. Cl. .................................. 525/100; 525/54.21; 525/444.5; 525/446; 525/464; 525/474; 525/476; 528/26; 528/29

[58] Field of Search ..................... 525/100, 446, 54.21, 525/444.5, 464, 474, 476; 528/26, 29; 260/29.2 M

[56] References Cited

U.S. PATENT DOCUMENTS

| | | | |
|---|---|---|---|
| 3,061,567 | 10/1962 | Keil ................................ | 260/29.2 M |
| 3,702,798 | 11/1972 | Shannon ............................. | 525/446 |
| 3,868,343 | 2/1975 | Stengle et al. ................. | 260/29.2 M |
| 4,069,178 | 1/1978 | Mikami et al. ..................... | 260/22 S |
| 4,287,109 | 9/1981 | Schlak et al. ........................ | 525/446 |

Primary Examiner—Wilbert J. Briggs, Sr.
Attorney, Agent, or Firm—Patent Department

[57] ABSTRACT

Organopolysiloxane modified organic polymers are prepared by reacting organic polymers containing C-bonded hydroxyl groups with organopolysiloxanes containing Si-bonded hydroxyl groups and/or alkyl groups which are bonded to silicon via oxygen in the presence of water in excess of any formed during the reaction.

3 Claims, No Drawings

PROCESS FOR PREPARING ORGANOPOLYSILOXANE MODIFIED ORGANIC POLYMERS

The present invention relates to modified organic polymers and more particularly to a process for preparing organopolysiloxane modified organic polymers.

BACKGROUND OF THE INVENTION

Organic polymers which have been modified with organopolysiloxanes and processes for preparing the same are known in the art. For example, W. Noll, Chemie und Technologie der Silicone, Second Edition, Weinheim 1968, pages 317 to 326 describes a method for preparing organopolysiloxane modified organic polymers which comprises reacting an organic polymer containing C-bonded hydroxyl groups with an organopolysiloxane containing Si-bonded hydroxyl groups and/or alkyl groups which are bonded to silicon via oxygen.

U.S. Pat. No. 4,069,178 to Mikami et al discloses a process for preparing water-soluble silicone modified alkyd resins in which (a) a prealkyd resin obtained from the reaction of a drying oil fatty acid with a dicarboxylic acid and/or anhydride thereof and aliphatic polyhydric alcohol is reacted with (b) a silicone compound and thereafter reacting (c) a polyvalent carboxylic acid anhydride with the reaction product of (a) and (b) in the absence of water. In the process described in this patent, the water is removed as it is formed during the reaction.

When compared with the processes described above, the process of this invention has certain advantages. For example, a substantially higher molecular weight organic polymer having C-bonded hydroxyl groups may be used for condensation with the organnopolysiloxane than could have been used in processes known heretofore. Also, the process of this invention results in the formation of an organopolysiloxane modified organic polymer whose viscosity is less likely to change in the presence of water.

Therefore, it is an object of this invention to provide a process for preparing organopolysiloxane modified organic polymers. Another object of this invention is to provide a process for preparing organopolysiloxane modified organic polymers in the absence of gellation. A further object of this invention is to provide a process for preparing organopolysiloxane modified organic polymers which have the desirable properties of both the organopolysiloxanes and the organic polymers.

SUMMARY OF THE INVENTION

The foregoing objects and others which will become apparent from the following description are accomplished in accordance with this invention, generally speaking, by providing a process for preparing organopolysiloxane modified organic polymers which comprises reacting an organic polymer containing C-bonded hydroxyl groups, with an organopolysiloxane containing Si-bonded hydroxyl groups and/or alkyl groups which are bonded to silicon via oxygen in the presence of water in excess of any formed during the reaction.

DETAILED DESCRIPTION OF THE INVENTION

In the process of this invention, the same organic polymers containing C-bonded hydroxyl groups ($\equiv$COH) which have been or could have been used in the processes known heretofore for preparing organopolysiloxane modified organic polymers by reacting organic polymers containing C-bonded hydroxyl groups, with organopolysiloxanes containing Si-bonded hydroxyl groups and/or alkyl groups bonded to silicon via oxygen may be used in the process of this invention. Examples of suitable organic polymers are polyesters containing C-bonded hydroxyl groups, acrylic resins containing C-bonded hydroxyl groups, epoxy resins having C-bonded hydroxyl groups, phenolic resins, melamine resins containing C-bonded hydroxyl groups, urea resins having C-bonded hydroxyl groups, polycarbonates having C-bonded hydroxyl groups and cellulose. Polyesters are the preferred organic polymers.

The polyesters may be free of or contain aliphatic multiple bonds. In addition, the polyesters may be modified, for example, with monocarboxylic acids containing aliphatic multiple bonds.

Examples of carboxylic acids containing at least two carboxyl groups per molecule, or anhydrides thereof, as well as their lower esters, which may be used as one of the reactants in the preparation of the polyesters, are aliphatic dicarboxylic acids such as oxalic acid, succinic acid, glutaric acid, adipic acid, pimelic acid, suberic acid, sebacic acid, decanedioic acids, dodecanedioic acids, 2,2,4-trimethyladipic acid and maleic acid anhydride. Examples of aromatic dicarboxylic acids and anhydrides thereof, as well as their esters, which may be employed are polycarboxylic acids such as phthalic acid anhydride, isophthalic acid, terephthalic acid, tetrahydrophthalic acid, naphthalene dicarboxylic acids, trimellitic acid, dimethylterephthalate and 1,2,4,5-benzenetetracarboxylic acid. In preparing the polyesters it is possible to use an aliphatic or aromatic carboxylic acid containing at least two carboxyl groups per molecule, or an anhydride or ester thereof. In addition, mixtures of caboxylic acids containing at least two different aliphatic and/or aromatic carboxyl groups and/or their anhydrides or esters may be employed in the preparation of the polyesters.

Examples of suitable alcohols which contain two hydroxyl groups per molecule which may be employed as one of the reactants in the preparation of the polyesters are 2,2-dimethyl-1,3-propanediol, trimethylolpropane, pentaerythritol, glycerol, dimethylolcyclohexane and ethylene glycol. In preparing the polyesters it is possible to use an alcohol having at least two hydroxyl groups per molecule or mixtures of alcohols containing at least two hydroxyl groups per molecule.

Examples of monocarboxylic acids containing an aliphatic multiple bond which may be used in modifying the polyesters are soy oil fatty acid and coconut oil fatty acid. However, the polyesters may also be modified by other means, for example, using modifying oils such as linseed oil and carboxylic acids which are free of aliphatic multiple bonds, such as benzoic acid and/or polyacrylates.

The organopolysiloxanes containing Si-bonded hydroxyl groups and/or alkyl groups that are bonded to silicon via oxygen, which are used in the process of this invention may be the same organopolysiloxanes which have been or could have been used heretofore in the preparation of organopolysiloxane modified organic polymers by reacting an organic polymer containing C-bonded hydroxyl groups with an organopolysiloxane containing Si-bonded hydroxyl groups and/or alkyl groups which are bonded to silicon via oxygen.

Preferably, the alkyl groups bonded to silicon via oxygen have from 1 to 4 carbon atoms per molecule.

Organopolysiloxanes which contain Si-bonded hydroxyl groups and/or alkyl groups that are bonded to silicon via oxygen may be represented by the general formula:

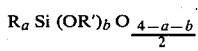

$$R_a Si(OR')_b O_{\frac{4-a-b}{2}}$$

where R represents the same or different monovalent hydrocarbon radicals and substituted monovalent hydrocarbon radicals; R' represents hydrogen or alkyl radicals having from 1 to 4 carbon atoms; a is 0, 1, 2 or 3, with an average of from 0.9 to 1.8; and b is 0, 1, 2 or 3, with an average of from 0.5 to 1.5.

Examples of hydrocarbon radicals represented by R are alkyl radicals, such as the methyl, ethyl, n-propyl, isopropyl, n-butyl and sec-butyl radicals, as well as the octyl and dodecyl radicals; cycloalkyl radicals such as cyclopentyl, cyclohexyl and cycloheptyl radicals; alkenyl radicals such as the vinyl and the allyl radicals; aryl radicals such as the phenyl radical; alkaryl radicals such as the tolyl radicals; and aralkyl radicals such as the benzyl radical. Examples of substituted hydrocarbon radicals represented by R are halogenated hydrocarbon radicals such as the 1,1,1-trifluoropropyl radical and the alpha,alpha,alpha-trifluorotolyl radicals as well as chlorophenyl and dichlorophenyl radicals. Preferably R represents the methyl and phenyl radicals.

Examples of alkyl radicals represented by R' are the methyl, ethyl, isopropyl and n-butyl radicals with the methyl radical being the preferred alkyl radical.

Examples of suitable organopolysiloxanes containing Si-bonded hydroxyl groups and/or alkyl groups which are bonded to silicon via oxygen are copolymers consisting of monophenylsiloxane units and dimthylsiloxane units having 14 percent by weight of Si-bonded methoxy groups and 5 percent by weight of Si-bonded n-butoxy groups, as well as organopolysiloxanes having the following formula:

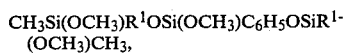

CH$_3$Si(OCH$_3$)R$^1$OSi(OCH$_3$)C$_6$H$_5$OSiR$^1$-(OCH$_3$)CH$_3$, where R$^1$ represents the methyl and/or the phenyl radical;

CH$_3$Si(OCH$_3$)R$^1$OSi(OCH$_3$)C$_6$H$_5$OSiR$^1$(OR$^2$)OCH$_3$ where R$^1$ is the same as above and R$^2$ represents an alkyl radical having from 2 to 4 carbon atoms;

[CH$_3$OSi(C$_6$H$_5$)O]$_4$;

2,6-dimethyl-4,8-diphenyl-2,4,6,8-tetramethoxy-cyclotetrasiloxane and an organopolysiloxane of the formula

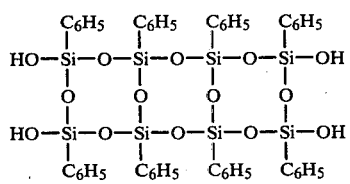

The ratio of C-bonded hydroxyl groups to Si-bonded hydroxyl and/or alkoxy groups may be varied over wide parameters. In fact, the C-bonded hydroxyl groups or the Si-bonded hydroxyl and/or alkoxy groups may be present in excess of the stoichiometric ratio.

It is preferred that the reaction of the organic polymer containing C-bonded hydroxyl groups, with the organopolysiloxane containing Si-bonded hydroxyl and/or alkoxy groups be conducted in the presence of water in an amount of from 1 to 10 percent by weight, in excess of any formed during the reaction, based on the total weight of the organic polymer having C-bonded hydroxyl groups and the organopolysiloxane containing Si-bonded hydroxyl groups and/or alkoxy groups which are bonded to silicon via oxygen.

Preferably, the reaction of an organic polymer having C-bonded hydroxyl groups and an organopolysiloxane containing Si-bonded hydroxyl groups and/or alkyl groups which are bonded to silicon via oxygen is carried out in the presence of a solvent. Examples of suitable solvents are xylols, cyclohexanone, alkyl glycol esters such as ethyl glycol acetate or n-butyl glycol acetate, which may be mixed with mono- or polyvalent alcohols such as n-butanol, ethylene glycol, butylene glycol, ethylene glycol monoethyl ether, or ethylene glycol mono-n-butyl ether.

The organic polymer containing C-bonded hydroxyl groups may be reacted with an organopolysiloxane containing Si-bonded hydroxyl groups and/or alkyl groups which are bonded to silicon via oxygen in the presence of catalysts which have been or could have been used heretofore to promote such reactions. Examples of suitable catalysts are titanium esters such as tetraisopropyltitanate, zirconium esters and acids and trifluoroacetic acid.

The reaction of an organic polymer containing C-bonded hydroxyl groups with an organopolysiloxane containing Si-bonded hydroxyl groups and/or alkyl groups which are bonded to silicon via oxygen, may be conducted at the same elevated temperatures and at the same pressures which have been or could have been used in the processes known heretofore for preparing organopolysiloxane modified organic polymers by reacting an organic polymer containing C-bonded hydroxyl groups, with an organopolysiloxane containing Si-bonded hydroxyl and/or alkoxy groups.

It is essential that water, in addition to that formed during the reaction, be present in the process of this invention. In order to ensure that water is present, it may be added prior to conducting the reaction in a closed reactor or the reaction may be conducted in a reactor equipped with a reflux condenser or water may be added while the reaction is in progress.

The reaction of the organic polymer containing C-bonded hydroxyl groups with an organopolysiloxane containing Si-bonded hydroxyl groups and/or alkyl groups which are bonded to silicon via oxygen, is terminated when a homogeneous polymer or a so-called "co-condensate" is obtained.

When the reaction is complete, the water formed from the condensation of the C-bonded hydroxyl groups with Si-bonded hydroxyl groups, or the alkanol formed during the condensation of the C-bonded hydroxyl groups with Si-bonded alkoxy groups, may be removed by distillation.

Organopolysiloxane modified organic polymers have the advantages of the organopolysiloxanes, such as weather- and heat-resistance and the advantages of the organic polymers, such as adhesion capacity, elasticity and hardening properties.

The organopolysiloxane modified organic polymers prepared in accordance with this invention may be used as binding agents for air- or oven-dried, weather- and heat-resistant coatings, for example for metals, especially as coatings for conveyors or for wood, as heat-resistant, electrically insulating impregnation agents for fiberglass coated wires and as binding agents for mica, fiberglass, rock wool, magnesium oxide or silicon dioxide, especially for manufacturing electrical insulating materials.

In the following examples all parts, ratios and percentages are by weight unless otherwise specified.

EXAMPLE 1

To a mixture containing 3 parts of a copolymer consisting of monophenylsiloxane units and dimethylsiloxane units in a molar ratio of 2:1 with 14 percent Si-bonded methoxy groups and 5 percent Si-bonded butoxy groups, 7 parts of a polyester having a calculated molecular weight of 860 which is obtained from the reaction of 59.5 parts trimethylolpropane, 36.3 parts isophthalic acid and 16.0 parts adipic acid and 0.035 parts tetraisopropyltitanate in 15 parts ethyl glycol acetate, are added 0.52 parts (1.5 percent of the total weight of the mixture) of water. The resultant mixture is boiled under reflux until a homogeneous polymer is obtained, then the constituents which boil at 100° C. at 1020 mbar are distilled off. The polymer solution is then heated to 140° C. until it has a viscosity of 1020 mm$^2$.s$^{-1}$ at 25° C.

When 1 percent water is added to the polymer solution, the viscosity decreases by 20 percent from the initial value within 7 days.

Comparison Example V$_1$

The process described in Example 1 is repeated, except that the 0.52 parts of water are omitted and the methanol generated during the reaction is removed by distillation as it forms.

The resultant polymer solution has a viscosity of 2500 mm$^2$.s$^{-1}$ at 25° C. Following the addition of 1 percent water, the viscosity decreases more than 40 percent from the initial value within 7 days.

EXAMPLE 2

The procedure described in Example 1 is repeated, except that 7 parts of a polyester obtained from the reaction of 562 parts of trimethylolpropane, 368 parts of adipic acid and 205 parts isophthalic acid, having a calculated molecular weight of 2260 are substituted for the 7 parts of polyester described in Example 1 and 2.08 parts (6 percent) of water are substituted for the 0.52 parts of water.

After the volatile constituents which boiled at 100° C. at 1020 mbar are removed by distillation, the mixture is heated to about 140° C. to form a polymer solution having a viscosity of from 1000 to 3000 m$^2$.s$^{-1}$ at 25° C.

The polymer solution is hardened by adding about 3 percent hexamethoxymethylmelamine (based on the weight of the modified polyester) as a hardening catalyst to the polymer solution and then heated for one minute to 260° C. The organopolysiloxane modified polyester thus obtained exhibits a high degree of hardness with excellent elasticity.

Comparison Example V$_2$

The process described in Example 2 is repeated except that the addition of water is omitted. The mixture jelled before a homogeneous polymer could be obtained.

EXAMPLE 3

About 1.04 parts of water (3 percent based on the total weight of the mixture) is added to a mixture consisting of 5 parts of monophenylpolysiloxane containing 5 percent of Si-bonded hydroxyl groups, 5 parts of a polyester obtained from equal parts of trimethylolpropane and terephthalic acid having a calculated molecular weight of 1240 and 0.035 parts tetraisopropyltitanate in 15 parts of ethyl glycol acetate. The resultant mixture is heated to boiling under reflux until a homogeneous polymer is formed. Thereafter the mixture is heated and the volatile constituents which boiled up to 100° C. at 1020 mbar are removed by distillation. The resultant product has a viscosity of 1000 m$^2$.s$^{-1}$ at 25° C.

Comparison Example V$_3$

The process described in Example 3 is repeated, except that no water is added and the water generated during the reaction is distilled off as it is formed. The viscosity of the mixture increased so rapidly that a usable polymer could not be obtained.

What is claimed is:

1. A process for preparing organopolysiloxane modified organic polymers which comprises reacting at an elevated temperature a mixture containing an organic polymer free of silicon atoms and having C-bonded hydroxyl groups with an organopolysiloxane containing groups selected from the class consisting of Si-bonded hydroxyl groups, alkyl groups which are bonded to silicon via oxygen and mixtures thereof in the presence of water which is in excess of that formed during the reaction.

2. The process of claim 1, wherein the amount of water present ranges from 1 to 10 percent by weight, based on the weight of the organic polymer having C-bonded hydroxyl groups and the organopolysiloxane containing groups selected from Si-bonded hydroxyl groups, alkyl groups which are bonded to silicon via oxygen and mixtures thereof.

3. The process of claim 1, wherein the reaction is conducted in the presence of catalysts which promote the reaction of the organic polymer with the organopolysiloxane.

* * * * *